ID_DIPHENYL-1-HYDROXY-4-(PYRROLIDYL)-BUTANONE-2

Albert Schlesinger, Jackson Heights, and Samuel M. Gordon, Forest Hills, N.Y., assignors to Endo Laboratories, Inc., Queens, N.Y., a corporation of New York
No Drawing. Filed July 1, 1955, Ser. No. 519,642
1 Claim. (Cl. 260—326.5)

This invention relates to novel ketones, particularly alpha-hydroxy-beta-ketones. More specifically, it is directed to basically substituted 1,1-diphenyl-1-hydroxy-butanone-2, the acid addition salts of said bases, and methods of preparing the same.

The free bases of said amino-hydroxy-ketones have the general structural formula:

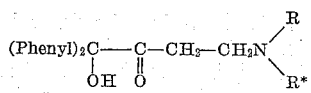

wherein R and R* designate various radicals such as: alkyl radicals, generally lower alkyl radicals, having a carbon content of from one to six carbon atoms, as for example, methyl, ethyl, propyl, butyl, amyl and hexyl; or phenyl and benzyl radicals; and wherein the aforesaid alkyl radicals may be either straight chain, branched or cyclic in structure; and wherein further R and R* may be joined to constitute the terminal ends of a radical which, together with the nitrogen atom, constitutes a cyclic secondary amino group typified, for example, by piperidino, morpholino, pyrrolidino, piperazino, N-alkyl piperazino and the like.

The aforesaid novel organic bases form addition salts with a variety of inorganic and strong organic acids.

It has been found that the novel aforesaid hydroxy-ketones have useful pharmacodynamic properties. In particular, the acid addition salts of these compounds possess powerful anti-acetylcholine effect and at the same time exert anti-histaminic activity.

Accordingly, it is among the principal objects of this invention to provide novel basically substituted 1,1-diphenyl-1-hydroxy-butanones-2.

One of the preferred methods for the manufacture of the novel hydroxy ketones aforesaid utilizes, as the starting material, 1,1-diphenyl-1-hydroxy-propanone-2, having the formula:

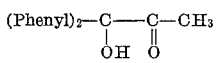

That propanone is heated under conditions corresponding to the general conditions of the Mannich reaction with formaldehyde or paraformaldehyde (trioxane), or a formaldehyde donor and a secondary amine, the amine being used preferably in the form of its hydrochloric salt, in water, and alcohol, dioxane or other suitable or convenient solvents.

The following are illustrative examples in accordance with this invention.

Example 1

43 gms. of 1,1-diphenyl-1-hydroxy propanone-2, 26.5 gms. of piperidine hydrochloride and 13 gms. of paraformaldehyde in 130 cc. of amyl alcohol are refluxed for two hours. After the reaction mixture has cooled to room temperature, 100 cc. of acetone and 200 cc. of ether are added thereto. This mixture is then cooled, as for example, in an ice bath, following which a crystalline product precipitates. The precipitated salt is then dissolved in 100 cc. of water and alkalinized with a 40% sodium hydroxide solution. The free base precipitates and is extracted with ether. The ethereal solution is dried over anhydrous calcium sulphate, filtered, and the ether evaporated. 50 cc. of toluene is added to the residue; and then also evaporated under reduced pressure.

The residue, an oil, is the 1,1-diphenyl-1-hydroxy-4-(piperidyl)-butanone-2.

This isolated base is then dissolved in 50 cc. of acetone, and ethanol saturated with hydrogen chloride added thereto in quantity sufficient to exhibit acidity with Congo red. Then, 100 cc. of ether is added to the acidified solution, the mass cooled, as for example, in an ice bath, resulting in the formation of a precipitate of the crystalline hydrochloride salt. The salt melts at 175°–176° C. It has the structural formula:

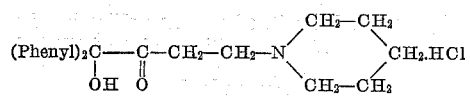

Example 2

8.6 gms. of 1,1-diphenyl-1-hydroxy-propanone-2, 3.2 gms. of pyrrolidine, 10 cc. of a 20% solution of hydrogen chloride in ethanol, 2.6 gms. of paraformaldehyde and 30 cc. of amyl alcohol are refluxed for five hours. The reaction mixture is cooled to room temperature and 400 cc. of acetone added thereto. On cooling, as for example, in an ice bath, a crystalline material soon precipitates. On recrystallization from a mixture of ethanol and acetone, the hydrochloride salt 1,1-diphenyl-1-hydroxy-4-(pyrrolidyl)-butanone-2 is obtained. Its formula is similar to that of the salt of Example 1 except that the pyrrolidyl radical is present in the place of the piperidyl radical.

The melting point of the salt is 179.50° C.

Example 3

8.6 gms. of 1,1-diphenyl-1-hydroxy propanone-2, 4 gms. of dimethylamine hydrochloride and 2.6 gms. of paraformaldehyde in 30 cc. of amyl alcohol are refluxed for two hours. After cooling, 200 cc. of acetone are added to the reaction mass and then 200 cc. of ether. A crystalline material soon precipitates. This crystalline product is then dissolved in 100 cc. of water, following which it is alkalinized with a 40% aqueous solution of sodium hydroxide; and then extracted with ether. The dried ethereal solution is filtered and the ether removed by evaporation. The residual oil is the 1,1-diphenyl-1-hydroxy-4-dimethylamino-butanone-2 having the formula:

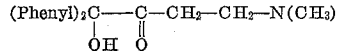

The hydrochloride salt is prepared by dissolving the free base in acetone and passing dry hydrogen chloride through the solution. The melting point of the hydrochloride is 175° C.

Example 4

8.6 gms. of 1,1-diphenyl-1-hydroxy-propanone-2, 3.6 gms. of diethylamine, 10 cc. of a 20% solution of hydrogen chloride in alcohol and 2.6 gms. of paraformaldehyde in 100 cc. of ethanol are refluxed for 24 hours. After cooling, 200 cc. of ether are added thereto; and the precipitated mixture removed. The precipitate is then dissolved in water, alkalinized, and extracted with ether. The dried ethereal solution is evaporated. The residual oil is the 1,1-diphenyl-1-hydroxy-4-diethylamine-butanone-2, having the formula:

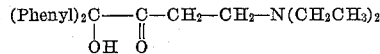

The hydrochloride salt thereof is prepared in a manner similar to that described for the preparation of the corresponding salt in Example 3. It has a melting point of 120° C.

Example 5

8.6 gms. of 1,1-diphenyl-1-hydroxy-propanone-2, 2.6 gms. paraformaldehyde and 5.5 gms. of morpholine hydrochloride in 30 cc. of amyl alcohol are refluxed for two hours. After the reaction mixture has cooled, 100 cc. of acetone and 100 cc. of ether are added thereto. The precipitated material is dissolved in water, alkalinized as described above, extracted with ether, and the dried ethereal solution is evaporated. The oily residue is the 1,1-diphenyl-1-hydroxy-4-morpholyl-butanone-2 having the formula:

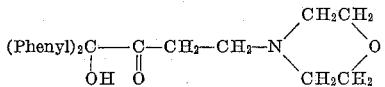

The hydrochloride salt, after recrystallization from isopropanol and ether, has a melting point of 182° C.

Example 6

5.7 gms. of dibutylamine, 10 cc. of a 20% hydrogen chloride solution in alcohol, 2.6 gms. of paraformaldehyde and 8.6 gms. of 1,1-diphenyl-1-hydroxy-propanone-2 in 30 cc. of amyl alcohol are refluxed for two hours. After cooling the reaction mixture, 200 cc. of ether are added thereto. A crystalline product precipitates. The product is alkalinized, extracted with ether and the ether than evaporated. The residual oil is the 1,1-diphenyl-1-hydroxy-4-dibutylamino-butanone-2 having the formula:

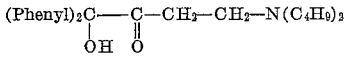

The hydrochloride salt of the base can be recrystallized from water. Its melting point is 153° C.

The following compounds may be prepared in accordance with the general procedure of Example 6 above-described:

1,1-diphenyl-1-hydroxy-4-di-n-propylamino-butanone-2, using di-n-propylamine as the amine reactant;

1,1-diphenyl-1-hydroxy-4-di-isopropylamino-butanone-2, using a di-isopropylamine as the amine reactant;

1,1-diphenyl-1-hydroxy-4-(N-ethyl benzyl amino)-butanone-2, using a N-ethyl benzylamine as the amine reactant;

1,1-diphenyl-1-hydroxy-4-(N-ethyl phenyl amino)-butanone-2, using N-ethylaniline as the amine reactant;

1,1-diphenyl-1-hydroxy-4-(dibenzylamino)-butanone, using dibenzylamine as the amine reactant;

1,1-diphenyl-1-hydroxy-4-(N-methyl piperazino)-butanone-2, using N-methyl piperazine as the amine reactant;

1,1-diphenyl-1-hydroxy-4-(di-n-amylamino)-butanone-2, using di-n-amylamine as the amine reactant;

1,1-diphenyl-1-hydroxy-4-(N-ethyl cyclohexylamino)-butanone-2, using N-ethyl cyclohexylamine as the amine reactant.

It will be understood that the foregoing description of the invention and the examples set forth are merely illustrative of the principles thereof. Accordingly, the appended claim is to be construed as defining the invention within the full spirit and scope thereof.

We claim:

1,1-diphenyl-1-hydroxy-4-(pyrrolidyl)-butanone-2.

References Cited in the file of this patent

UNITED STATES PATENTS

| | | |
|---|---|---|
| 2,550,745 | Wilder et al. | May 1, 1951 |
| 2,580,494 | Wilder et al. | Jan. 1, 1952 |
| 2,835,676 | Sprague et al. | May 20, 1958 |